United States Patent [19]

Tsuchiya et al.

[11] Patent Number: 5,292,381
[45] Date of Patent: Mar. 8, 1994

[54] PISTON RING AND PROCESS FOR MANUFACTURING THE SAME

[75] Inventors: Takeshi Tsuchiya; Shuji Sameshima; Yoshio Onodera; Satoshi Kawashima, all of Yono, Japan

[73] Assignee: Nippon Piston Ring Co., Ltd., Japan

[21] Appl. No.: 913,349

[22] Filed: Jul. 15, 1992

[30] Foreign Application Priority Data

Jul. 24, 1991 [JP] Japan ................. 3-184876

[51] Int. Cl.$^5$ .............................................. C21D 1/06
[52] U.S. Cl. ..................................... 148/318; 148/230; 148/212
[58] Field of Search ..................... 148/212, 230, 318

[56] References Cited

U.S. PATENT DOCUMENTS 2,390,417 12/1945 Bramberry ..................... 148/230

FOREIGN PATENT DOCUMENTS 60-155056 8/1985 Japan ........................... 148/230
2153488 8/1985 United Kingdom ............... 148/318

Primary Examiner—Deborah Yee
Attorney, Agent, or Firm—Parkhurst, Wendel & Rossi

[57] ABSTRACT

The object of the present invention is to provide a piston ring which is free from occurrence of cracks on the nitrided layer and having enhanced abrasion resistance and fatigue strength, and to provide a process for manufacturing the piston ring. In the invention, a surface of the steel body is subjected to a two-stage nitriding treatment consisting of low-temperature nitriding and high-temperature nitriding. A white layer on the slidable surface along the inner periphery surface of a cylinder is removed, and a white layer on each of the upper and lower surfaces and the corner portions each being adjacent to the slidable surface is removed to have a thickness of not more than 5 μm.

9 Claims, 8 Drawing Sheets

PISTON RING AND PROCESS FOR MANUFACTURING THE SAME

FIELD OF THE INVENTION

This invention relates to a piston ring used for an internal combustion engine, and more particularly to steel compression rings, and to a process for manufacturing same.

BACKGROUND OF THE INVENTION

Under current social needs, internal combustion engines having improved output energy, such as those of high-rotation high-output type and those of high-compression type including supercharging devices, have been developed in recent years. Therefore, piston rings used for those internal combustion engines are required to be up-graded in accordance with the development of internal combustion engines.

Further, fuels containing no lead have been recently employed from the viewpoint of prevention of environmental pollution, but lead-containing fuels are still employed in various countries. In cylinders of the internal combustion engines using those lead-containing fuels, a corrosive atmosphere such as HCl and $H_2SO_4$ is strikingly produced, so that chrome-plated piston rings which are conventionally and widely used seriously suffer from abrasion of a chrome-plated layer on the sliding surface. For coping with this problem, those piston rings are subjected to a large thickness-chrome plating treatment, but the resulting piston rings are not always satisfactory with respect to manufacturing cost and productivity.

Furthermore, a piston ring whose slidable surface is subjected to a nitriding treatment to resist abrasion of the slidable surface have been also developed. Accordingly, enhancement of the abrasion resistance and the corrosion resistance are more highly demanded than before, and increase of piston rings of this type is expected. In addition to the enhancements of the abrasion resistance and the corrosion resistance, breakage resistance should be also improved, because the piston rings might be broken when they are used in the internal combustion engines of high-rotation and high-output type.

FIG. 16 shows a part of a compression ring 1 which is a conventional piston ring, and on a surface of a steel body 2 is formed a nitrided layer 3 by means of a nitriding treatment. In accordance with the nitriding treatment, a porous layer of high rigidity and brittleness (generally referred to as "white layer") is formed on a surface of the nitrided layer. This rigid and brittle porous layer is removed by subjecting a slidable layer 4 to the post treatment, whereby the piston ring can be commercialized.

An example of the composition of the steel body is as follows in terms of wt. %:
C: 0.60–0.70,
Si: not more than 0.35,
Mn: 0.20–0.50,
Cr: 13.00–14.00,
Mo: 0.20–0.40,
Fe: residual portion, and inevitable impurity.

Another example of the composition of the steel body is as follows in terms of wt. %:
C: 0.80 (0.85)–0.95,
Si: 0.35–0.50,
Mn: 0.25–0.40,
Cr: 17.00–18.00,
Mo: 1.00–1.25,
V: 0.08–0.15,
Fe: residual portion, and inevitable impurity.

A further example of the composition of the steel body is as follows in terms of wt. %:
C: 0.87–0.93,
Si: 0.20–0.40,
Mn: 0.20–0.40,
Cr: 21.00–22.00,
Mo: 0.20–0.40,
Ni: 0.90–1.10,
Fe: residual portion, and inevitable impurity.

When the compression ring 1 is fitted into a piston groove of the piston in one of the above-mentioned internal combustion engines and is operated therein, the ring expands and contacts in the radial direction and collides with the wall of the piston groove repeatedly, and thereby cracks are produced in the nitrided layer 3 during the operation, resulting in cracks 5, 7 on the slidable surface 4 and the side surface 6. Enlargement of these cracks causes unfavorable phenomena such as totally dropping or partial dropping of the nitrided layer, whereby a peeled portion 8 occurs on the slidable surface 4. In the extreme case, these phenomena might cause scuffing or abnormal abrasion of the compression ring 1 or might cause even breakage of the compression ring 1. Further, the compression ring repeatedly collides with the piston groove owing to its expanding and contracting motions in the radial direction and vertical motions in the axial direction. Therefore, if a porous white layer of high rigidity and brittleness remains on the corner portions C or in the vicinity thereof, cracks are easily brought about on those portions. The cracks are enlarged from those portions, and finally the compression ring is broken off in many cases.

SUMMARY OF THE INVENTION

This invention intends to solve the above-mentioned problems, and the object of the invention is to provide a piston ring which is free from occurrence of cracks on the nitrided layer and is improved in abrasion resistance and fatigue strength, and to provide a process for manufacturing the piston ring.

According to one aspect of this invention, there is provided a piston ring having a nitrided layer formed by subjecting a surface of a steel body to a nitriding treatment, the steel body having a slidable surface which is to face an inner peripheral surface of a cylinder, a first surface and a second surface both of which are connected to the slidable surface by way of corner portions, wherein the nitrided layer consists of a low-temperature nitrided layer formed by low-temperature nitriding and a high-temperature nitrided layer formed by high-temperature nitriding, a white layer on the slidable surface is removed, and a white layer on each of the first surface, the second surface and the corner portions is removed to have a thickness of not more than 5 μm.

According to another aspect of this invention, there is provided a process for manufacturing a piston ring comprising forming a nitrided layer by subjecting a surface of a steel body to a nitriding treatment, the steel body having a slidable surface which is to face an inner periphery surface of a cylinder, a first surface and a second surface both of which are connected to the slidable surface by way of corner portions, wherein the surface of the steel body is subjected to low-temperature nitriding and then subjected to high-temperature nitriding, or the surface of the steel body is subjected to high-temperature nitriding and then subjected to low-temperature nitriding. Then, white layer on the slidable layer is removed to expose a diffusion layer, and a white layer on each of the first surface, the second surface and the corner portions is removed to have a thickness of not more than 5 μm.

The white layer of the nitrided layer initially remaining on each of the corner portions, the first surface and the second surface of the steel body has a large thickness, for example, a thickness of 20 μm. Therefore, if an impact or a shock is applied to the white layer, cracks are easily brought about, and the piston ring tends to be broken off. However, when the white layer is thinned so as to have a thickness of not more than 5 μm according to the invention, this thin white layer can be improved in the toughness, and as a result, the piston ring can be enhanced in the breakage resistance. Further, even if a crack occurs, the depth of the crack is shallow and the size of the crack is small, so that notch effect can be made smaller and fatigue strength can be enhanced. Moreover, since the nitriding treatment is carried out in continuous two stages of low-temperature nitriding and high-temperature nitriding in this order or in continuous two stages of high-temperature nitriding and low-temperature nitriding in this order, the resulting nitrided layer has a two-layer structure of a low-temperature nitrided layer and a high-temperature nitrided layer, and thereby the nitrided layer is free from occurrence of cracks. As a result, the piston ring has enhanced abrasion resistance and the fatigue strength.

DETAILED DESCRIPTION OF THE INVENTION

One example of this invention is described below referring to the attached drawings.

Figure 1:
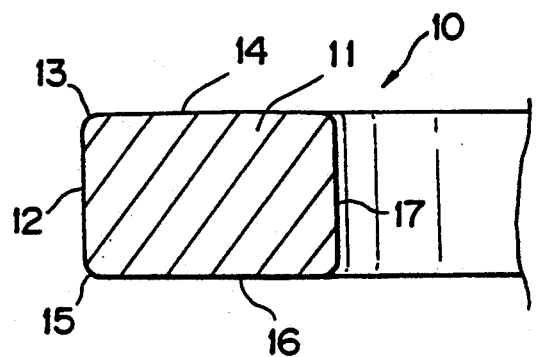
FIG. 1 is a sectional view of a compression ring prior to subjecting it to a nitriding treatment.
Figure 2:
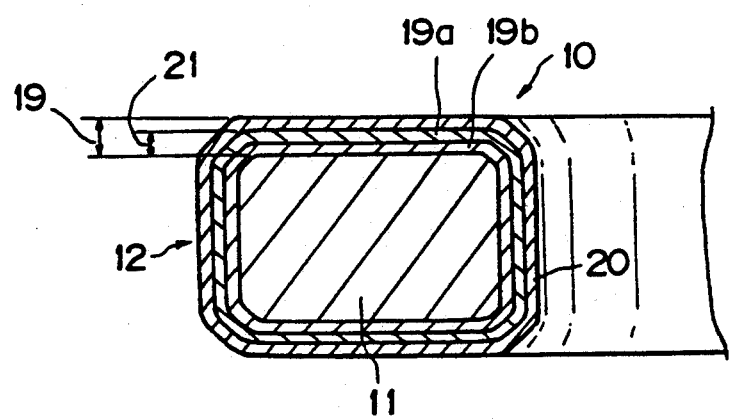
FIG. 2 is a sectional view of a compression ring having a nitrided layer formed by subjecting the surface of the compression ring shown in FIG. 1 to a nitriding treatment.
Figure 3:
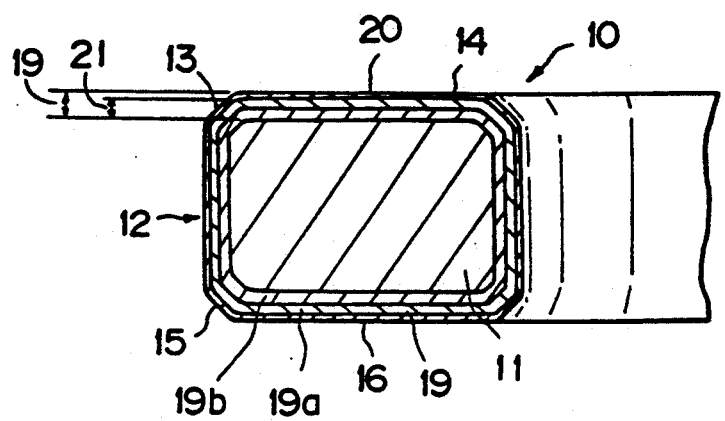
FIG. 3 is a sectional view of a compression ring obtained by removing a white layer on the slidable surface of the compression ring shown in FIG. 2 by a mechanical process, and removing a white layer on each of the corner portions and the upper and lower surfaces of the compression ring by a mechanical process so as to have a thickness of not larger than 5 μm.
Figure 4:
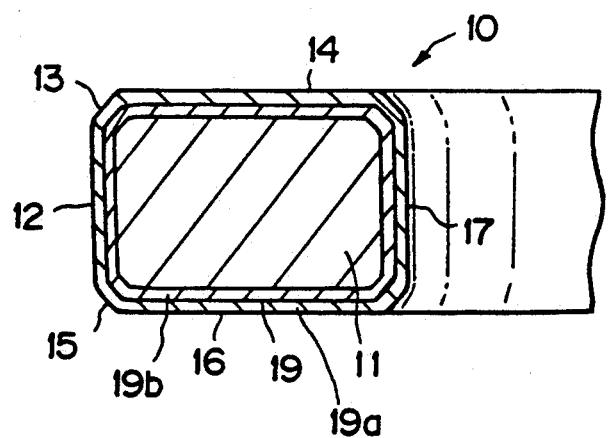
FIG. 4 is a sectional view of a compression ring obtained by completely removing the white layer of the nitrided layer of the compression ring shown in FIG. 3 remaining on each of the corner portions and the upper and lower surfaces.
Figure 5:
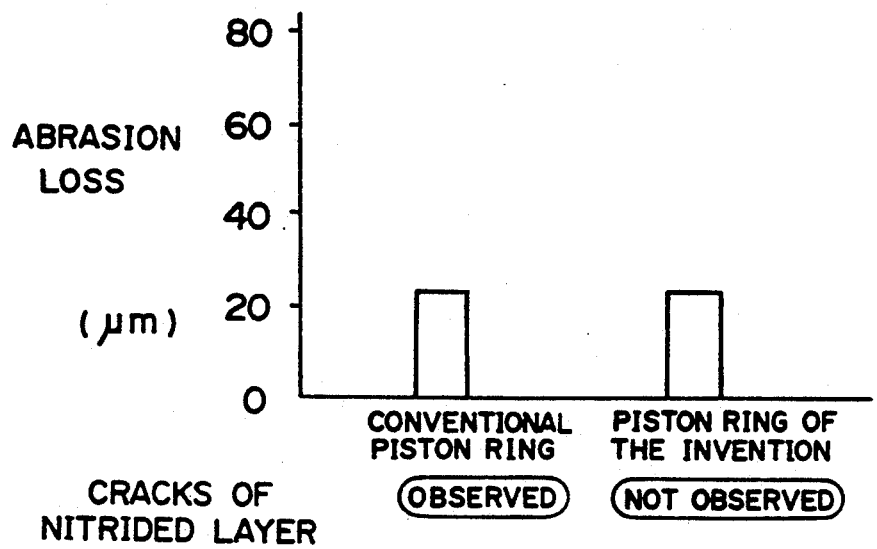
FIG. 5 is a graph showing results of Experiment F.

FIG. 1 is a sectional view of a steel compression ring 10 as a piston ring, and it shows a state of the compression ring prior to subjecting the ring to a nitriding treatment. A steel body 11 made of for example a stainless steel such as $SUS420J_2$ has a slidable surface 12 which is positioned on the outer peripheral side of the ring and is to slidably contact a cylinder, an upper surface 14 (as a first surface) connected to the slidable surface 12 by way of a corner portion 13, a lower surface 16 (as a second surface) connected to the slidable surface 12 by way of a corner portion 15, and an inner peripheral surface 17 which is positioned on the inner periphery side of the ring. When the surface of the steel body 11 shown in FIG. 1 is subjected to the later-described nitriding treatment, a nitrided layer 19 consisting of two diffusion layers 19a, 19b is formed all over the surface of the steel body 11, as shown in FIG. 2. It is confirmed by observation of an optical microscope that a layer of white color, namely, a white layer 20 (compound layer), is produced on the surface portion of the nitrided layer 19, and this white layer 20 is an extremely rigid and brittle layer in the porous state. In the nitrided layer 19, a diffusion layer 21 connected to the white layer 20 is formed on the side of the steel body 11. In the white layer and the diffusion layer, a compound of iron, Cr, etc. with nitrogen is present. This nitrogen diffuses from the surface of the layer to the inside thereof, so that the concentration of nitrogen gradually becomes lower from the surface side to the inside. In this example, as shown in FIG. 3, the white layer 20 of the nitrided layer 19 formed on the slidable surface 12 is removed by the subsequent mechanical process so that the diffusion layer having rigidity of a certain value is exposed outside, and the white layer 20 on the upper and lower surfaces 14, 16 and on the corner portions 13, 15 is removed so as to have a thickness of not more than 5 μm (including 0 μm) by the mechanical process. In the conventional type, the white layer 20 of the compression ring 10 shown in FIG. 3 has a thickness of about 20 μm. Therefore, when the white layer repeatedly collides with a piston groove by the expanding and contracting motion in the radial direction and the vertical motion in the axial direction, the collision impact sometimes causes occurrence of cracks in the remaining white layer 20. Further, when the white layer 20 is dropped off to produce an abrasive powder, and abnormal abrasion is easily induced in various parts including an opposite material. However, there is no fear of occurrence of such problem in the case where the thickness of the white layer is not more than 5 μm. As shown in FIG. 5, the white layer 20 remaining on each of the corner portions 13, 15 and the upper and lower surfaces 14, 16 of the compression ring 10 shown in FIG. 3 may be completely removed. For removing the white layer, a low-concentration aqueous solution of acids such as $H_2SO_4$ and HCl may be used, or a mechanical process may be carried out using a grinding device equipped with a grindstone.

The white layer on each of the upper and lower surfaces 14, 16 and the corner portions 13, 15 may be completely removed so as to have a thickness of 0 μm, but the cost of this process is high and the resulting compression ring has a redundant quality. In other words, for attaining the enhancement of fatigue strength while simplifying the process to make a cost lower, it is enough that the thickness of the white layer is not more than 5 μm, as described above. That is, the maximum effects can be obtained by the minimum quality (processing steps).

The nitriding treatment is carried out by subjecting a surface of the compression ring steel body 11 to low-temperature nitriding and then subjecting it to high-temperature nitriding. Thereafter, the white layer 20 on at least the slidable surface 12 is removed to expose the diffusion layer.

This nitriding treatment can be also carried out by subjecting the surface of the compression ring steel body 11 to high-temperature nitriding and then subjecting it to low-temperature nitriding. Thereafter, the white layer 20 on at least the slidable surface 12 is removed to expose the diffusion layer.

By any one of those processes, the nitrided layer 19 is composed of a low-temperature nitrided layer formed by the low-temperature nitriding and a high-temperature nitrided layer formed by the high-temperature nitriding. As a result, a first diffusion layer 19a is formed on the outer side, and a second diffusion layer 19b is formed on the inner side of the first diffusion layer 19a, as shown in FIGS. 2 and 3.

The temperature in the low-temperature nitriding is preferably within the range of 500° C.±5° C. to 550° C.±5° C. The nitriding treatment is possible at a temperature of lower than 500° C.±5° C., but it takes a long period of time to obtain a nitrided layer of a predetermined depth, resulting in disadvantages in productivity and cost. On the other hand, when the temperature in the low-temperature nitriding exceeds 550° C.±5° C., the subsequent high-temperature nitriding must be carried out by setting a larger difference between the temperature in the high-temperature nitriding and the temperature in the low-temperature nitriding, and in this case, a predetermined rigidity of the nitrided layer can be hardly obtained. Moreover, when the temperature in the low-temperature nitriding exceeds 550° C.±5° C., a sufficient rigidity is not obtained in the resulting nitrided layer in some cases, and thereby the abrasion resistance becomes insufficient. From these viewpoints, the above-mentioned temperature range is preferred.

The temperature in the high-temperature nitriding is preferably within the range of 560° C.±5° C. to 600° C.±5° C. From the requirement that a difference between the temperature in the low-temperature nitriding and that in the high-temperature nitriding is not leas than 1° C., the temperature on the lower temperature side in the high-temperature nitriding is more preferably 556° C.–565° C. instead of 560° C.±5° C. When the temperature in the high-temperature nitriding is higher than the upper limit of the above range, a predetermined rigidity of the nitrided layer is not obtained, and thereby the abrasion resistance cannot be improved. Accordingly, the above-mentioned temperature range is preferred.

The tolerance (±5° C.) of the temperatures in the low-temperature nitriding and the high-temperature nitriding means scattering of a temperature profile within a nitriding furnace.

EXPERIMENT

Experiments made by the present inventors are described below.

Experiment A (A-1)

In Experiments A to E, the white layer was removed using acid chemicals of low concentration so as to have a thickness of the above-mentioned value (not more than 5 μm, including 0 μm). That is, the compression ring 10 shown in FIG. 2 was immersed in the acid chemicals to remove the white layer. The conditions for removing the white layer include a concentration of the used chemicals, a treating temperature and a treating time, and they are appropriately determined in consideration of workability, safety and cost so that the thickness of the remaining white layer becomes not more than 5 μm.

In Experiment A, the fatigue strength of test materials (i.e., a piston ring prepared by the process of the invention and a piston ring prepared by a conventional process) were measured by the following test, and they were compared with each other.

1) Testing device: fatigue tester for piston ring
2) Testing conditions:
Stress: repetition of 0 kg/mm²–50 kg/mm²
Atmosphere: an aqueous solution of $H_2SO_4$ (pH 3.5)

The test material was repeatedly operated until it was broken, and the test material was evaluated by the repetition number.

3) Test material:

Conventional piston ring: A steel body having the following composition was subjected to a fixed temperature nitriding treatment (550° C.×15 hours). Since this nitriding treatment was a conventional one, a rigid and brittle white layer on only the slidable surface was removed, and a white layer having a thickness of about 20 μm still remained on the corner portions.

Composition (% by weight):
C: 0.87,
Si: 0.42,
Mn: 0.30,
Cr: 17.50,
Mo: 1.03,
V: 0.10,
Fe: residual portion, and inevitable impurity.

Piston ring of the invention: A steel body having the same composition as that of the conventional steel body was subjected to low-temperature nitriding and then subjected to high-temperature nitriding. That is, the steel body was subjected to a two-stage nitriding treatment consisting of low-temperature nitriding (500° C.×12 hours) and then high-temperature nitriding (580° C.×7 hours) (the same as that in Experiment G), and then immersed in an acid aqueous solution of low concentration to remove the extremely rigid and brittle white layer on the surface. The conditions for removing the white layer and the residual thickness of the white layer are as follows.

Conditions For Removing White Layer (a) treating liquid: aqueous solution of sulfuric acid ($H_2SO_4$)
(b) concentration of treating liquid: 1.2%
(c) treating temperature: 35° C.
(d) treating time: 13 minutes
(e) residual thickness of the white layer (in the finished product):
slidable surface: 0 μm
upper surface: 0 μm
lower surface: 0 μm
inner peripheral surface: 2 μm
corner portions: 2 μm
4) Result:

The results are set forth in Table 1. As is evident from Table 1, the piston ring of the present invention has a fatigue strength of about 10 times of that of the conventional piston ring.

TABLE 1

| Test material | Repetition number | N value |
| --- | --- | --- |
| Conventional piston ring | | |
| No. 1 | $2.5 \times 10^5$ | N = 5 |
| No. 2 | $3.7 \times 10^5$ | |
| No. 3 | $4.0 \times 10^5$ | |
| No. 4 | $5.0 \times 10^5$ | |
| No. 5 | $5.8 \times 10^5$ | |
| Piston ring of the invention (No. 1–No. 5) | $2 \times 10^6$ or more (not broken) | N = 5 |

(A-2)

The above procedure (A-1) was repeated except for varying the residual thickness of the white layer (in the finished product) in the conditions for removing the white layer to the following thickness, to carry out the fatigue test.

(e) residual thickness of the white layer (in the finished product):
slidable surface: 0 μm
upper surface: 0 μm
lower surface: 0 μm
inner peripheral surface: 0 μm
corner portions: 0 μm
Result:

The results are set forth in Table 2. As is evident from Table 2, the piston ring of the present invention has a fatigue strength of about 10 times of that of the conventional piston ring.

TABLE 2

| Test material | Repetition number | N value |
| --- | --- | --- |
| Conventional piston ring | | |
| No. 1 | $2.2 \times 10^5$ | N = 3 |
| No. 2 | $1.1 \times 10^5$ | |
| No. 3 | $1.3 \times 10^5$ | |
| Piston ring of the invention (No. 1–No. 3) | $2 \times 10^6$ or more (not broken) | N = 3 |

Experiment B

Test materials whose steel bodies had different compositions as those of the test materials used in Experiment A were subjected to fatigue test, and the fatigue strength of the piston ring of the invention and the conventional piston ring were compared with each other on the fatigue strength.

1) Testing device: the same as that of Experiment A
2) Testing conditions: the same as those of Experiment A
3) Test material:

Conventional piston ring: A steel body having the following composition was subjected to a nitriding treatment. Since this nitriding treatment was a conventional one, a rigid and brittle white layer on only the slidable surface was removed, and a white layer having a thickness of about 20 μm still remained on the corner portions.

Composition (% by weight):
C: 0.91,
Si: 0.30,
Mn: 0.29,
Cr: 21.63,
Mo: 0.30,
Ni: 0.99,
Fe: residual portion, and inevitable impurity.

Piston ring of the invention: A steel body having the same composition as that of the conventional steel body was subjected to a two-stage nitriding treatment (the same as that in Experiment A), and then immersed in an acid aqueous solution of low concentration to remove the extremely rigid and brittle white layer on the surface. The conditions for removing the white layer and the residual thickness of the white layer are as follows.

Conditions for removing the white layer: the same as those of Experiment A-1 with respect to the treating liquids and the treating conditions.

Residual thickness of the white layer (in the finished product):
slidable surface: 0 μm
upper surface: 0 μm
lower surface: 0 μm
inner peripheral surface: 3 μm
corner portions: 3 μm
4) Result:

The results are set forth in Table 3. As is evident from Table 3, the fatigue strength of the piston rings according to the invention is extremely high as compared with that of the conventional piston rings.

TABLE 3

| Test material | Repetition number | N value |
| --- | --- | --- |
| Conventional piston ring | | |
| No. 1 | $4.0 \times 10^5$ | N = 6 |
| No. 2 | $5.0 \times 10^5$ | |
| No. 3 | $5.0 \times 10^5$ | |
| No. 4 | $3.6 \times 10^5$ | |
| No. 5 | $2.4 \times 10^5$ | |
| No. 6 | $1.3 \times 10^5$ | |
| Piston ring of the invention (No. 1–No. 6) | $2 \times 10^6$ or more (not broken) | N = 6 |

Experiment C

Test materials whose steel bodies had the same compositions as those of the test materials used in Experiment B were subjected to fatigue test varying the testing conditions, and the fatigue strength of the ring of the invention and the conventional piston ring were compared with each other.

1) Testing device: the same as that of Experiment A
2) Testing conditions:

The test was carried out in air, and the fatigue strength was determined from the S-N curve.

3) Test material:

Conventional piston ring: the same as that of Experiment B

Piston ring of the invention: the same as that of Experiment B

4) Result:

The results are set forth in Table 4. As is evident from Table 4, the fatigue strength of the piston ring according to the invention is extremely high as compared with that of the conventional piston ring.

TABLE 4

| Test material | Fatigue strength |
| --- | --- |
| Conventional piston ring | 57 kg/mm² |
| Piston ring of the invention | 85 kg/mm² |

Experiment D

Using a steel body having the same composition as that of the steel body of Experiment B, a test material having a thickness of the white layer exceeding the upper limit of the aforementioned range and a test material having a thickness of the white layer not exceeding the upper limit of the aforementioned range were prepared. They were tested under the same testing conditions as those of Experiment A.

1) Testing device: the same as that of Experiment A
2) Testing conditions: the same as those of Experiment A
3) Test material (having the same composition as that of the test material of Experiment B):

Piston ring having a thickness of the white layer of more than 5 μm:
slidable surface: 0 μm (actual value)
upper surface: 6 μm (actual value)
lower surface: 6 μm (actual value)
inner peripheral surface: 8 μm (actual value)
corner portions: 10 μm (actual value)

Piston ring having a thickness of the white layer of not more than 5 μm:
slidable surface: 0 μm (actual value)
upper surface: 0 μm (actual value)
lower surface: 0 μm (actual value)
inner peripheral surface: 3 μm (actual value)
corner portions: 5 μm (actual value)

4) Result:

The results are set forth in Table 5. It has been confirmed from Table 5 that when the thickness of the white layer exceeds 5 μm, the fatigue strength is decreased.

TABLE 5

| Test material | Repetition number | N value |
| --- | --- | --- |
| More than 5 μm in thickness of white layer | | |
| No. 1 | $1.0 \times 10^6$ | N = 2 |
| No. 2 | $8.5 \times 10^6$ | N = 2 |
| Not more than 5 μm in thickness of white layer (No. 1–No. 2) | $2 \times 10^6$ or more (not broken) | N = 2 |

Experiment E (E-1)

An endurance test using actual piston ring was carried out by means of the following testing engine, and occurrence of breakage of the test material was observed.

1) Testing engine: 2,800 cc, water cooling, straight 4-cylindered diesel engine
2) Testing conditions:

From idle (about 420 hours) to 4,750 r.p.m. (up and down), 200,000 cycles

3) Test material:

First cylinder: piston ring of the invention in Experiment A

Second cylinder: piston ring of the invention in Experiment A

Third cylinder: piston ring of the invention in Experiment A

Fourth cylinder: conventional piston ring in Experiment A

4) Result:

The results are set forth in Table 6. As is evident from Table 6, the piston rings in the second and fourth cylinders were broken, but the piston rings in the first and third cylinders had no trouble.

TABLE 6

| Cylinder | Test material | Breakage |
| --- | --- | --- |
| 1 | Piston ring of the invention in Experiment A | not observed |
| 2 | Conventional piston ring in Experiment A | observed |
| 3 | Piston ring of the invention in Experiment A | not observed |
| 4 | Conventional piston ring in Experiment A | observed |

(E-2)

The above procedure of (E-1) was repeated except for using the following test materials to perform an endurance test using actual piston ring, and occurrence of breakage was observed.

Test material:

First cylinder: piston ring of the invention in Experiment B

Second cylinder: conventional piston ring in Experiment B

Third cylinder: conventional piston ring in Experiment B

Fourth cylinder: conventional piston ring in Experiment B

Result:

The results are set forth in Table 7. As is evident from Table 7, the piston rings in the second and fourth cylinders were broken, but the piston rings in the first and third cylinders had no trouble.

TABLE 7

| Cylinder | Test material | Breakage |
| --- | --- | --- |
| 1 | Piston ring of the invention in Experiment B | not observed |
| 2 | Conventional piston ring in Experiment B | observed |
| 3 | Piston ring of the invention in Experiment B | not observed |
| 4 | Conventional piston ring in Experiment B | observed |

As is evident from the results obtained in Experiments A to E, the fatigue strength was remarkably enhanced by forming a nitrided layer having a two-layer structure consisting of a low-temperature nitrided layer and a high-temperature nitrided layer and removing the white layer according to the invention, and any breakage in the operation was not observed.

Accordingly, it is very effective to employ the compression ring of this invention in internal combustion engines, particularly in the internal combustion engines of high-rotation and high output type.

Experiment F

In Experiment F, grinding is used as a means for removing the white layer remaining on the corner portions 13, 15 and the upper and lower surfaces 14, 16 of the compression ring 10 so as to have a thickness of not more than 5 μm. For the grinding, a grindstone, a cutting tool or the like was used, and the white layer was removed to have a thickness of not more than 5 μm.

In Experiment F, the test materials were subjected to the following fatigue test, and the fatigue strength of the piston ring prepared by a conventional process and the piston ring prepared by the process of the invention were compared, with each other.

1) Testing device: the same as that of Experiment A
2) Testing conditions: the same as those of Experiment A
3) Test material:
   Conventional piston ring: the same as the conventional piston ring in Experiment B
   Piston ring of the invention: The same steel body as that of Experiment B was subjected to the same nitriding treatment as that of Experiment A, and the white layer on the corner portions and the upper and lower surfaces was removed by a grinding process using a grindstone under wet grinding conditions. The residual thickness of the white layer was as follows.
   Residual thickness of the white layer (in the finished product):
   slidable surface: 0 μm
   upper surface: 0 μm
   lower surface: 0 μm
   inner peripheral surface: 15 μm
   corner portions: 0 μm
4) Result:
   The results are set forth in Table 8. As is evident from Table 8, the piston ring of the invention is remarkably enhanced in the fatigue strength as compared with the conventional piston ring (about 2 times of the strength of the conventional piston ring).

TABLE 8

| Test material | Repetition number | N value |
|---|---|---|
| Conventional piston ring | | |
| No. 1 | $4.0 \times 10^5$ | N = 6 |
| No. 2 | $5.0 \times 10^5$ | |
| No. 3 | $5.0 \times 10^5$ | |
| No. 4 | $3.6 \times 10^5$ | |
| No. 5 | $2.4 \times 10^5$ | |
| No. 6 | $1.3 \times 10^5$ | |
| Piston ring of the invention (No. 1–No. 3) | $9.0 \times 10^6$ $1.0 \times 10^6$ $1.0 \times 10^6$ | N = 3 |

As is evident from the results of Experiment F, the fatigue strength was improved by the invention. In this case, grinding of the inner peripheral surface was not carried out, so that the white layer still remained on the inner peripheral surface. However, this white layer did not have any influence on the fatigue strength of the compression ring. When the productivity is considered, it is enough that the thickness of the white layer is not more than 5 μm, and the remarkable effect can be obtained as shown in the example of the invention.

Experiment G

By the use the following testing engine, an endurance test using actual piston ring was carried out, to compare abrasion wears of the compression rings and to observe occurrence of cracks on the compression rings.

1) Testing engine: 2,800 cc, water cooling, straight 4-cylindered diesel engine
2) Testing conditions:
   4,200 r.p.m. (all load)×1,000 hours (endurance)
3) Test material (compression ring):
   Conventional piston ring: A steel body having the same composition as that of the steel body in Experiment A was subjected to the same nitriding treatment as that of Experiment A. Since this nitriding treatment was a conventional one, the rigid and brittle white layer on only the slidable surface was removed, and the white layer having a thickness of about 20 μm still remained on the corner portions.
   Piston ring of the invention: A steel body having the same composition as that of the steel body in Experiment A was subjected to a two-stage nitriding treatment (the same treatment as that of Experiment A). The white layer was removed in the same manner as that of Experiment A-1.
4) Result:
   The results are shown in FIG. 5. As shown in FIG. 5 the abrasion loss of the conventional piston ring and the piston ring of the invention were almost the same as each other. With respect to cracks on the nitrided layer, the conventional piston ring had cracks, but the piston ring of the invention did not have any cracks.

Experiment H

Changing the testing engine, occurrence of cracks on the nitrided layer was observed.

1) Testing engine: 11,000 cc, water cooling, V-type 8-cylinder diesel engine
2) Testing conditions:
   2,300 r.p.m. (all load)×50 hours
3) Test material: the same as that of Experiment G
4) Result:
   The conventional piston ring had cracks on the nitrided layer, but the piston ring of the invention did not have any cracks.

Experiment I

Using test pieces, a basic abrasion test was carried out.

Figure 6:
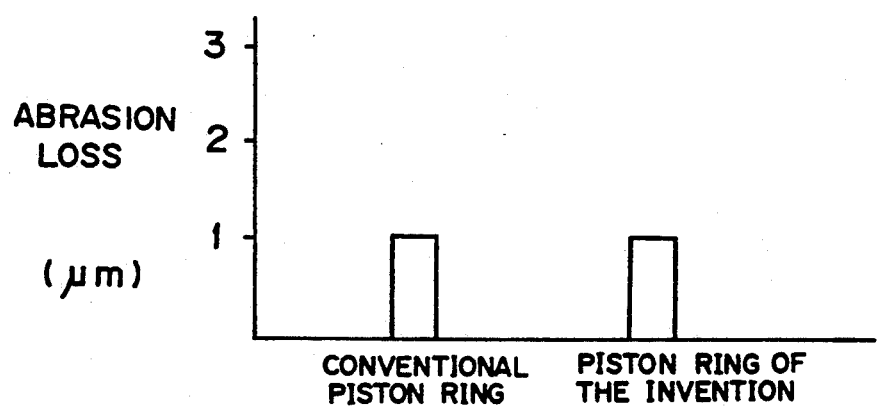
FIG. 6 is a graph showing results of Experiment H.

1) Testing device: Amsler type abrasion tester
2) Load: 80 kgf
3) Peripheral speed: 1 m/sec (rotation speed of 478 r.p.m.)
4) Time: 7 hours (corresponding to a travel of 25 km)
5) Lubricating oil: R30 motor oil (SAE #30)
6) Oil temperature: 75° C.±2.5° C.
7) Test material:
   For both of the conventional piston ring and the piston ring of the invention, test pieces for compression ring were prepared in the same manner as that of Experiment A. As the opposite material, a material corresponding to JIS FC25 was used.
8) Result:
   The results are shown in FIG. 6. The abrasion wears of the conventional piston ring and the piston ring of the invention were almost the same as each other.

Experiment J

Using test pieces, a scuffing test was carried out.
1) Testing device:

The same basic abrasion tester as that of Experiment H was run for a certain period of time, and the surface pressure of the test piece was gradually increased to a critical surface pressure at which scuffing was brought about.

2) Peripheral speed: 1 m/sec (rotation speed of 478 r.p.m.)

3) Lubricating oil: R30 motor oil (SAE #30)+white kerosene (1:1)

4) Oil temperature: 75° C.±2.5° C.

5) Surface pressure:

The surface pressure was set to 10 kgf/cm² at the beginning, and was increased by 5 kgf/cm² every 5 minutes until seizure was brought about.

6) Test material:

The test pieces and the opposite material were the same as those of Experiment I.

Figure 7:
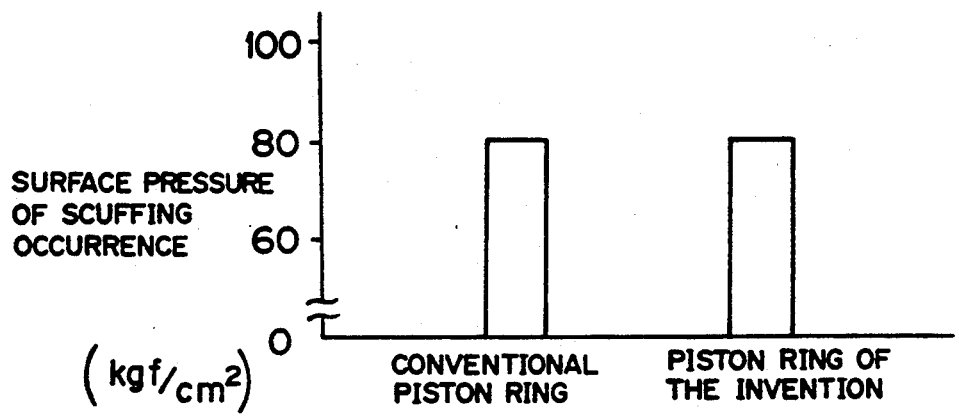
FIG. 7 is a graph showing results of Experiment I.
Figure 8:
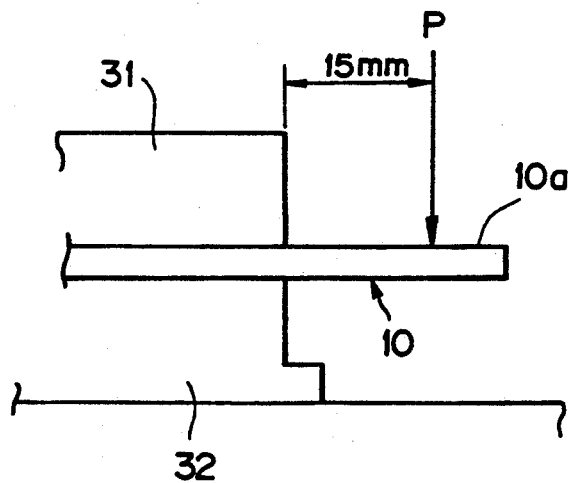
FIG. 8 is a schematic view illustrating a test method in Experiment O with respect to one example of the invention.

7) Result:

The results are shown in FIG. 7. The stuff resistances of the conventional piston ring and the piston ring of the invention were almost the same as each other.

It was confirmed from the results obtained by Experiments G to J that the piston ring of this invention gave no detrimental influence on the abrasion resistance and the scuff resistance, and was excellent without any occurrence of cracks, and dropping or partial dropping of the nitrided layer during the operation. Further, no cracks were observed on the nitrided layer. Accordingly, in the case of using a compression ring of this invention, leakage of compression gas and combustion gas from a combustion room of the internal combustion engine can be restrained as small as possible.

Experiment K (K-1)

An abrasion test was carried out using actual piston rings, and the piston rings were evaluated on the crack resistance.

1) Testing device: actual type abrasion tester
2) Peripheral speed: 3.3 m/sec (800 r.p.m.)
3) Lubricating oil: 7.5W-30
4) Oil amount: 1 cc/min
5) Opposite material: material equivalent to JIS FC25
6) Test material (piston ring):

Piston ring A of the invention: A steel body having the same composition as that of the steel body of Experiment A-1 was subjected to low-temperature nitriding (500° C.×12 hours) and then to high-temperature nitriding (580° C.×7 hours). The white layer was removed in the same manner as described in Experiment A-1.

Piston ring B of the invention: A steel body having the same composition as that of the steel body of the above piston ring A was subjected to high-temperature nitriding (580° C.×7 hours) and then subjected to low-temperature nitriding [any one of 510° C.×7 hours (piston ring B-1 of the invention), 530° C.×5 hours (piston ring B-2 of the invention) and 550° C.×4 hours (piston ring B-3 of the invention)]. The white layer was removed in the same manner as described in Experiment A-1.

7) Result:

The results are set forth in Table 9. As is evident from Table 9, the piston ring of the invention had higher load of crack occurrence as compared with the conventional piston ring, and it was confirmed that the piston ring of the invention was enhanced in the crack resistance.

TABLE 9

|  | Piston ring A of the invention | Piston ring B of the invention | | |
|---|---|---|---|---|
| Nitriding conditions | 500° C. × 12 hr 580° C. × 7 hr | 580° C. × 7 hr 510° C. × 7 hr (B-1) | 580° C. × 7 hr 530° C. × 5 hr (B-2) | 580° C. × 7 hr 550° C. × 4 hr (B-3) |
| Ratio of high-temperature nitriding time to all nitriding time | — | 50% | 58.3% | 63.6% |
| Load of crack occurrence | 50 kgf | 60 kgf | 60 kgf | 60 kgf |

(K-2)

The procedure of the above (K-1) was repeated except for replacing the test materials with the following test materials, to evaluate the crack resistance of the test materials.

1) Test material (piston ring):

Piston ring A of the invention: A steel body having the same composition as that of the steel body of Experiment B was subjected to low-temperature nitriding (500° C.×15 hours) and then to high-temperature nitriding (580° C.×10 hours). The white layer was removed in the same manner as described in Experiment A-1.

Piston ring B of the invention: A steel body having the same composition as that of the conventional steel body of the above piston ring A was subjected to high-temperature nitriding (580° C.×8 hours) and then subjected to low-temperature nitriding [any one of 510° C.×7 hours (piston ring B-1 of the invention), 530° C.×5 hours (piston ring B-2 of the invention) and 550° C.×4 hours (piston ring B-3 of the invention)]. The white layer was removed in the same manner as described in Experiment A-1.

2) Result:

The results are set forth in Table 10. As is evident from Table 10, the piston ring of the invention had higher load of crack occurrence as compared with the conventional piston ring, and it was confirmed that the piston ring of the invention were improved in the crack resistance.

TABLE 10

| | Piston ring A of the invention | Piston ring B of the invention | | |
|---|---|---|---|---|
| Nitriding conditions | 500° C. × 15 hr<br>580° C. × 10 hr | 580° C. × 8 hr<br>510° C. × 7 hr<br>(B-1) | 580° C. × 8 hr<br>530° C. × 5 hr<br>(B-2) | 580° C. × 8 hr<br>550° C. × 4 hr<br>(B-3) |
| Ratio of high-temperature nitriding time to all nitriding time | — | 53.3% | 61.5% | 66.7% |
| Load of crack occurrence | 40 kgf | 50 kgf | 50 kgf | 50 kgf |

Experiment L

The procedure of the above Experiment K-1 was repeated except for varying the ratio of the high-temperature nitriding time to all nitriding time, to evaluate the crack resistance of the test materials.

1) Testing device: actual type abrasion tester
2) Peripheral speed: 3.3 m/sec (800 r.p.m.)
3) Lubricating oil: 7.5W-30
4) Oil amount: 1 cc/min
5) Opposite material: material equivalent to JIS FC25
6) Test material (piston ring):

(a) A steel body having the same composition of that of the steel body used in Experiment K-1 (i.e., following composition) was subjected to high-temperature nitriding (580° C.×4 hours) and then to low-temperature nitriding (550° C.×6 hours). In this case, the ratio of the high-temperature nitriding time to the entire nitriding time was 40%.

Composition (% by weight):
C: 0.87,
Si: 0.42,
Mn: 0.30,
Cr: 17.50,
Mo: 1.03,
V: 0.10,
Fe: residual portion, and inevitable impurity.

(b) A steel body having the same composition as that of the steel body used in Experiment K-2 (i.e., following composition) was subjected to high-temperature nitriding (580° C.×5 hours) and then to low-temperature nitriding (550° C.×6 hours). In this case, the ratio of the high-temperature nitriding time to all nitriding time was 45.5%. The rigid and brittle porous layer on the surface of the test material was removed.

Composition (% by weight):
C: 0.91,
Si: 0.30,
Mn: 0.29,
Cr: 21.63,
Mo: 0.30,
Ni: 0.99,
Fe: residual portion, and inevitable impurity.

7) Result:

The results are set forth in Table 11 and Table 12. As is evident from Table 11 and Table 12, the crack resistance of the piston rings of the invention is equivalent to that of the piston ring A of the invention in the aforementioned Experiment K-1 which was subjected to low-temperature nitriding and then subjected to high-temperature nitriding, when the ratio of the high-temperature nitriding time to the entire nitriding time is 40% (case of the test material (a)) and 45.5% (case of the test material (b)). From these results and the results obtained by Experiment K, it has been confirmed that the piston ring can be further improved in the crack resistance when the ratio of the high-temperature nitriding time to all nitriding time is not less than 50%.

TABLE 11

| | Piston ring A of the invention in Experiment K-1 | Piston ring B of the invention in Experiment K-1 | Piston ring (a) |
|---|---|---|---|
| | 500° C. × 12 hr<br>580° C. × 7 hr | 580° C. × 7 hr<br>550° C. × 4 hr<br>(63.6%) | 580° C. × 5 hr<br>550° C. × 6 hr |
| Load of crack occurrence | 50 kgf (from Experiment K-1) | 60 kgf (from Experiment K-1) | 50 kgf |

TABLE 12

| | Piston ring A of the invention in Experiment K-2 | Piston ring B of the invention in Experiment K-1 | Piston ring (b) |
|---|---|---|---|
| | 500° C. × 15 hr<br>580° C. × 10 hr | 580° C. × 8 hr<br>550° C. × 4 hr<br>(66.7%) | 580° C. × 5 hr<br>550° C. × 6 hr<br>(45.5%) |
| Load of crack occurrence | 40 kgf (from Experiment K-2) | 50 kgf (from Experiment K-2) | 40 kgf |

Experiment M

An endurance test using actual piston ring was carried out by means of the following testing engine, and occurrence of cracks was observed.

1) Testing engine: 2,800 cc, water cooling, straight 4-cylindered diesel engine
2) Testing conditions:
4,200 r.p.m. (all load)×300 hours (endurance)
3) Test material:

First cylinder: piston ring A of the invention in Experiment K-1

Second cylinder: piston ring B of the invention in Experiment K-1. This piston ring was subjected to high-temperature nitriding (580° C.×7 hours) and then subjected to low-temperature nitriding (530° C.×5 hours) (piston ring B-2 of the invention).

Third cylinder: piston ring A of the invention in Experiment K-1

Fourth cylinder: piston ring B of the invention in Experiment K-1. This piston ring was subjected to high-temperature nitriding (580° C.×7 hours) and then subjected to low-temperature nitriding (530° C.×5 hours) (piston ring B-2 of the invention).

The rigid and brittle porous layer on the surface of each of the test materials was removed.

4) Result:

The results are set forth in Table 13. As is evident from Table 13, no cracks were observed on both the piston ring A of the invention and the piston ring B of the invention.

TABLE 13

| Cylinder | Test material | Crack |
|---|---|---|
| 1 | Piston ring A of the invention in Experiment K-1 | not observed |
| 2 | Piston ring B (B-2) of the invention in Experiment K-1 (580° C. × 7 hr → 530° C. × 5 hr) | not observed |
| 3 | Piston ring A of the invention in Experiment K-1 | not observed |
| 4 | Piston ring B (B-2) of the invention in Experiment K-1 (580° C. × 7 hr → 530° C. × 5 hr | not observed |

Experiment N

The procedure of the above Experiment M was repeated except for replacing the test materials with the following test materials to perform an endurance test using actual piston ring, and occurrence of cracks was observed.

1) Test material:
First cylinder: piston ring A of the invention in Experiment K-2

Second cylinder: piston ring B(B-2) of the invention in Experiment K-2. This piston ring was subjected to high-temperature nitriding (580° C.×8 hours) and then subjected to low-temperature nitriding (530° C.×5 hours).

Third cylinder: piston ring A of the invention in Experiment K-2

Fourth cylinder: piston ring B(B-2) of the invention in Experiment K-2. This piston ring was subjected to high-temperature nitriding (580° C.×8 hours) and then subjected to low-temperature nitriding (530° C.×5 hours).

The rigid and brittle porous layer on the surface of each of the test materials was removed.

4) Result:
The results are set forth in Table 14. As is evident from Table 14, no cracks were observed on both the piston ring A of the invention and the piston ring B of the invention.

TABLE 14

| Cylinder | Test material | Crack |
|---|---|---|
| 1 | Piston ring A of the invention in Experiment K-2 | not observed |
| 2 | Piston ring B (B-2) of the invention in Experiment K-2 (580° C. × 8 hr → 530° C. × 5 hr) | not observed |
| 3 | Piston ring A of the invention in Experiment K-2 | not observed |
| 4 | Piston ring B (B-2) of the invention in Experiment K-2 (580° C. × 8 hr → 530° C. × 5 hr | not observed |

Experiment O

Figure 9:
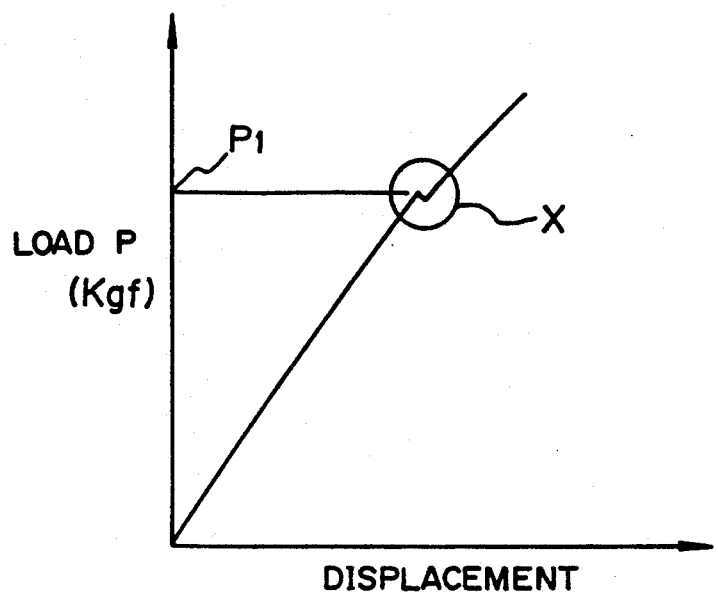
FIG. 9 is a graph showing a relationship between a load and a displacement in Experiment O.

Actual piston rings were subjected to flexural test, to evaluate the toughness of the piston rings.
1) Testing device: actual type flexure tester
2) Test method:
As shown in FIG. 9, the piston ring 10 is held by holding tools 31, 32 in such a manner that a part of the piston ring protrudes between the holding tools, and a load P is applied onto the piston ring from the upper side of the protruded portion 10a. A rate of fall of the load P is 0.5 mm/min.

Figure 10:
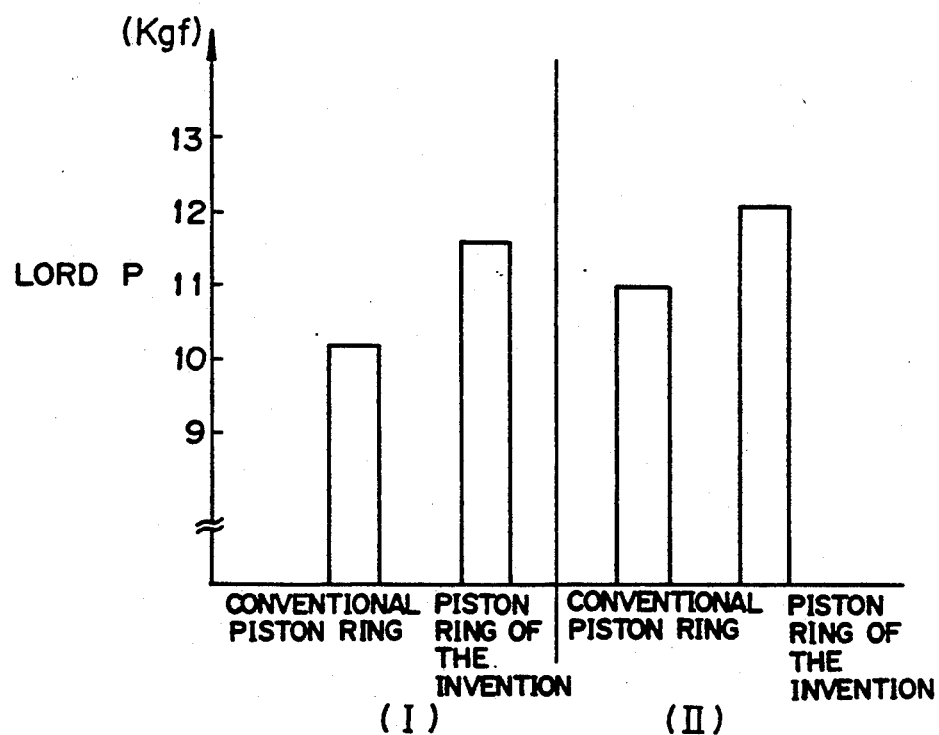
FIG. 10 is a graph showing results of Experiment O.

FIG. 10 shows a relationship between the load P and a displacement given by this test. As shown in FIG. 10, when a crack occurs in the piston ring, the load is somewhat decreased (portion indicated by X in FIG. 10). With respect to the load $P_1$ at that time, the piston ring of the invention and the conventional piston ring were compared with each other.

3) Test material:
Piston ring A of the invention:
(I) piston ring A of the invention in Experiment K-1
(II) piston ring A of the invention in Experiment K-2
Piston ring B of the invention:
(I) piston ring B(B-2) of the invention in Experiment K-1. This piston ring was subjected to high-temperature nitriding (580° C.×8 hours) and then subjected to low-temperature nitriding (530° C.×5 hours).
(II) piston ring B(B-2) of the invention in Experiment K-2. This piston ring was subjected to high-temperature nitriding (580° C.×8 hours) and then subjected to low-temperature nitriding (530° C.×5 hours).

4) Result:
The results are shown in FIG. 10. As shown in FIG. 10, the load of crack occurrence in the case of the piston ring B of the invention is higher than that in the case of the piston ring A of the invention. That is, it has been confirmed that the toughness attained by the piston ring B can be prominently enhanced further in comparison with the piston ring A.

In each of the above-mentioned examples of the invention, any one of a plated layer, a sprayed layer and an ion-plated layer is preferably formed on the surface of the exposed diffusion layer, and thereby the scuffing resistance and the abrasion resistance of the piston ring can be much more enhanced.

Figure 11:
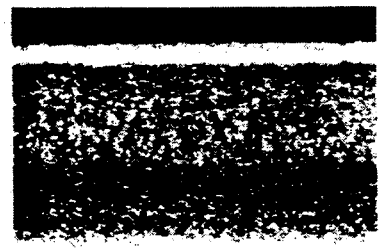
FIG. 11 is a photomicrographic view showing a section of a compression ring obtained by a nitriding process according to the invention.
Figure 12:
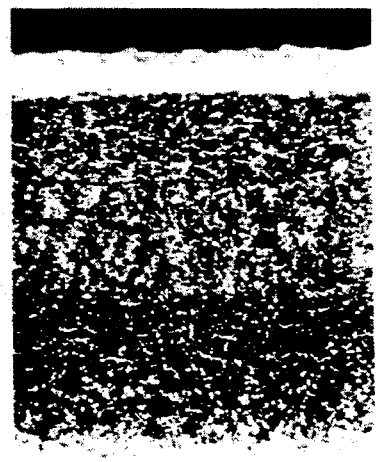
FIG. 12 is an enlarged view of an essential part of FIG. 11.
Figure 13:
FIG. 13 is a photomicrographic view showing a section of a compression ring obtained by a conventional nitriding process.
Figure 14:
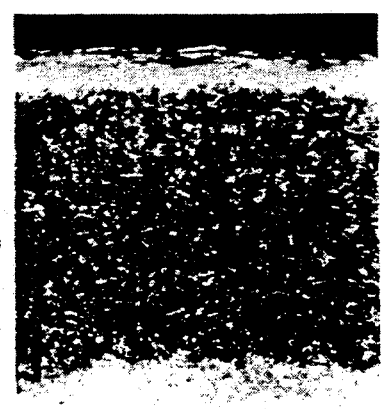
FIG. 14 is an enlarged view of an essential part of FIG. 13.

Next, the present invention and a conventional example are described below referring to FIGS. 11 to 14 each being a photomicrographic view showing metal construction. Each of FIGS. 11 and 13 is a photomicrograph of 200 magnifications, and each of FIGS. 12 and 13 is a photomicrograph of 400 magnifications. Each of FIGS. 12 and 13 shows metal construction of a section of a compression ring according to the invention. In each of FIGS. 12 and 13, the topmost black portion is a resin used for abrasion in the abrasion test, and the compression ring has a multi-layer structure consisting of a white layer b (porous layer, white gray portion), a first diffusion layer c (gray portion), a second diffusion layer d (gray black portion) and a steel body e (white portion), placed downward in this order. Each of FIGS. 13 and 14 shows metal construction of a section of a compression ring manufactured using a conventional nitriding process (550° C.×6 hours). In each of FIGS. 14 and 15, the topmost black portion is the above-mentioned resin a, and the compression ring has a multi-layer structure consisting of a white layer b (porous layer, white gray portion), a diffusion layer f (gray portion) and a steel body e (white portion), placed downward in this order. This diffusion layer f does not have a two-layer structure.

Figure 15:
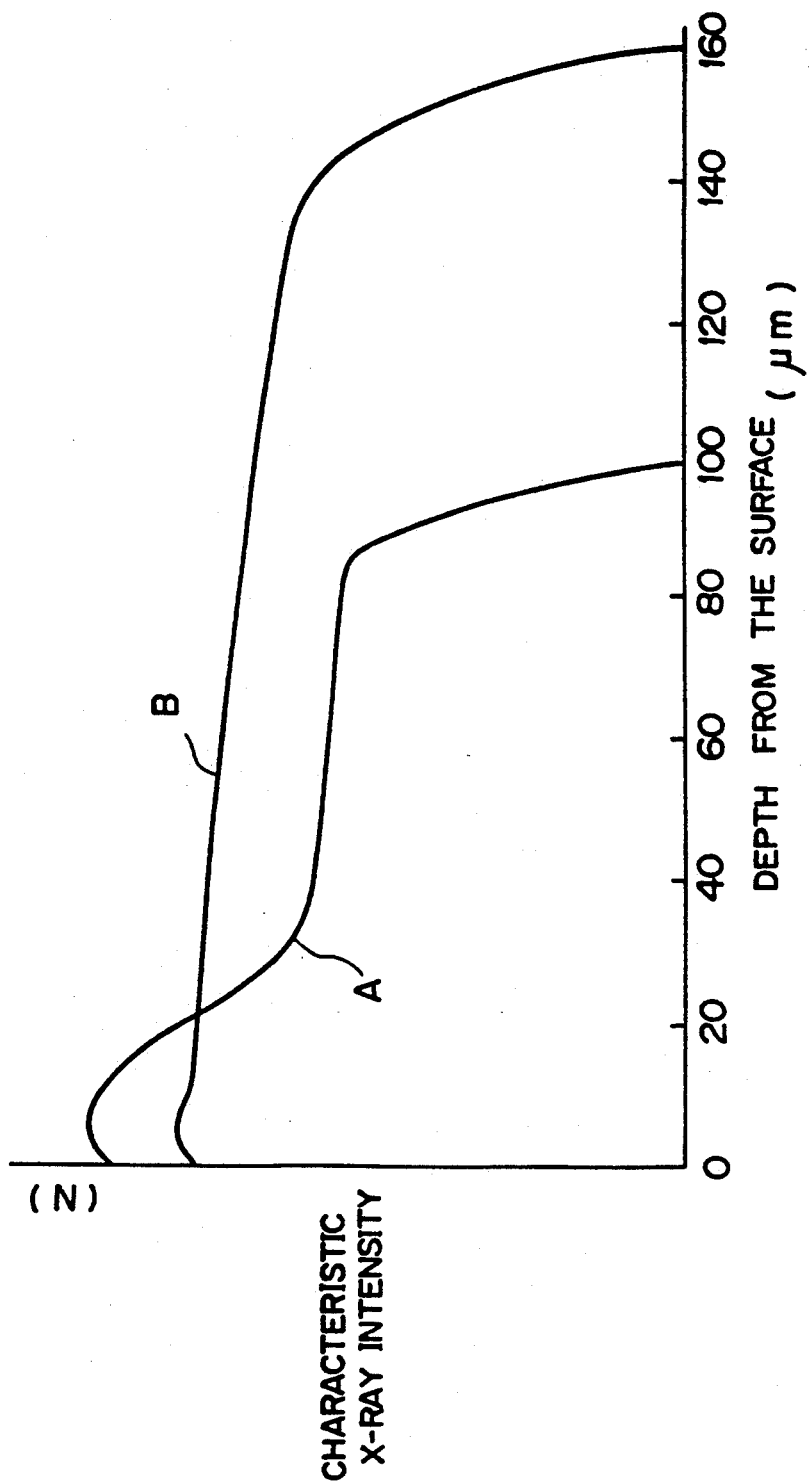
FIG. 15 is a graph showing results on the N concentration obtained by EPMA line analysis.
Figure 16:
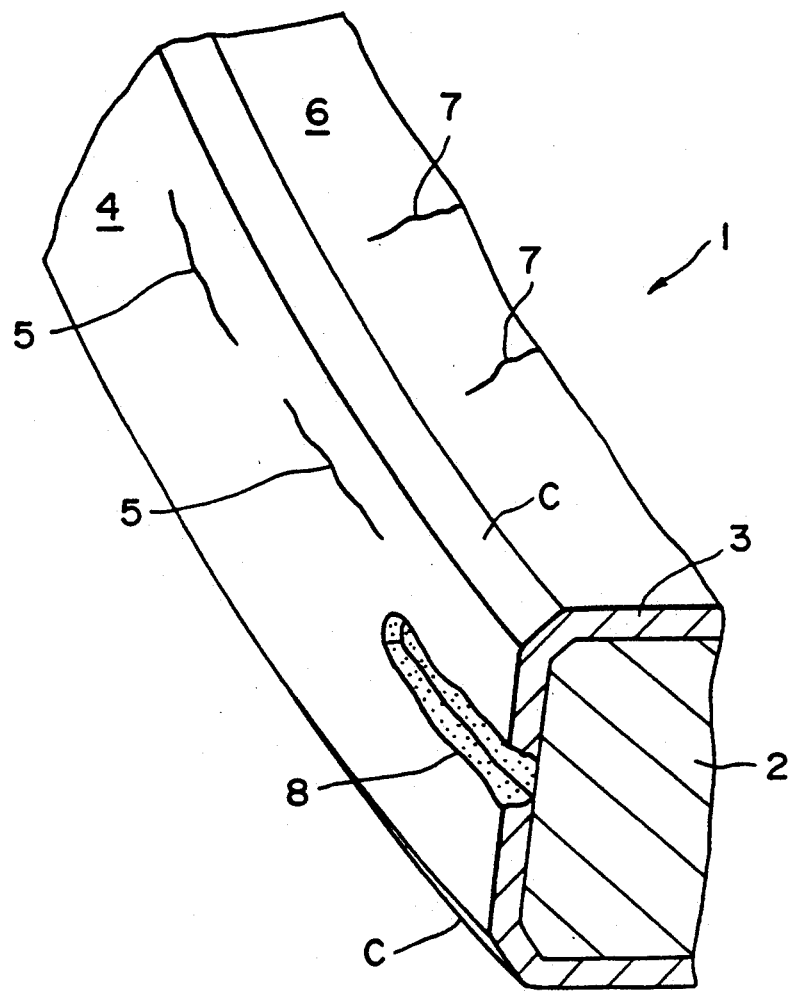
FIG. 16 is a perspective view of a conventional compression ring.

FIG. 15 is a graph showing results of EPMA line analysis in which an elemental analysis is made with respect to a variation of N (nitrogen) concentration in the nitrided layer from the surface side to the inside after the nitriding treatment. In FIG. 13 a depth of the nitrided layer from the metal surface is plotted as abscissa, and a characteristic X-ray intensity indicating N (nitrogen) concentration is plotted as ordinate. Curve A indicates data obtained by nitriding the compression ring by a conventional nitriding process, that is, Curve A indicates cases of compression rings shown in FIGS. 13 and 14. As shown in FIG. 16, the N concentration is high in the vicinity of the surface and is abruptly decreased inside close to the surface. As the depth becomes larger, the N concentration is gradually decreased. Then, the N concentration is abruptly varied from the depth of about 90 μm and becomes 0 μm. In the case of the conventional nitriding process, a nitrided layer having a N concentration of particularly high level is formed in the vicinity of the surface. On the other hand, Curve B indicates data obtained by nitriding the compression ring by the nitriding process of the invention, that is, Curve B indicates cases of compression rings shown in FIGS. 11 and 12. The N concentration in the vicinity of the surface is lower than the case of the conventional nitriding method. As the depth becomes larger, the N concentration is gradually decreased. Then, the N concentration is abruptly varied from the depth of about 140 μm and becomes 0 μm. In the case of the invention, a nitrided layer having a N concentration of low level which is neither rigid nor brittle is formed in the vicinity of the surface. Further, when the N concentration is gradually and slowly varied, even the deep portion is nitrided, and a nitrided layer (diffusion layer) whose thickness is larger than the thickness of the conventional one is formed. As a result, cracks hardly occur in the nitrided layer.

EFFECT OF THE INVENTION

In the piston ring of this invention and the process for manufacturing the piston ring, a nitriding treatment is carried out in two stages of low-temperature nitriding and high-temperature nitriding. Further, the white layer on the slidable surface is removed, and the white layer on each of the corner portions and the first and second surfaces connected to the slidable surface by way of the corner portions is removed to have a thickness of not more than 5 μm. Therefore, the piston ring can be improved in the abrasion resistance, and cracks do not occur on the nitrided layer, whereby the breakage resistance of the piston ring can be enhanced.

Further, in the case of forming any one of a plated layer, a sprayed layer and an ion-plated layer on the surface of the diffusion layer, the scuffing resistance and the abrasion resistance of the piston ring can be much more improved.

What is claimed is:

1. A piston ring comprising:
   a steel body having a slidable surface which is to face an inner peripheral surface of a cylinder, a first surface and a second surface both connected to the slidable surface by way of corner portions;
   a nitrided layer consisting of a low-temperature nitrided layer formed by low-temperature nitriding and a high-temperature nitrided layer formed by high-temperature nitriding, said nitrided layer being formed on said slidable, first and second surfaces and said corner portions, said nitrided layer comprising a diffusion layer and an outer white layer formed thereon, wherein
   a first portion of a white layer which is formed on the slidable surface is removed, and a second portion of the white layer which is formed on each of the first surface, the second surface and the corner portions is at least partially removed to have a thickness of not more than 5 μm.

2. The piston ring of claim 1, further comprising at least one of a plated layer, a sprayed layer and an ion-plated layer formed on a surface of the diffusion layer of the nitrided layer.

3. The piston ring of claim 1, wherein the low-temperature nitride layer is formed at a first temperature within a temperature range of 500° C.±5° C. to 550° C.±5° C., the high-temperature nitrided layer is formed at a second temperature within a temperature range of 560° C.±5° C. to 600° C.±5° C., and a difference between the first and second temperatures is not less than 1° C.

4. A process for manufacturing a piston ring comprising:
   forming a nitrided layer by subjecting a surface of a steel body to a nitriding treatment, said steel body having a slidable surface which is to face an inner peripheral surface of a cylinder, a first surface and a second surface both connected to the slidable surface by way of corner portions, wherein the nitriding treatment comprises a first step of low-temperature nitriding and a second step of high-temperature nitriding, wherein an outer surface of the nitrided layer comprises a white layer;
   removing a first portion of the white layer which is formed on the slidable surface to expose a diffusion layer; and
   at least partially removing a second portion of the white layer which is formed on each of the first surface, the second surface and the corner portions such that said second portion has thickness of not more than 5 μm.

5. The process of claim 4, further comprising the step of forming at least one of a plated layer, a sprayed layer and an ion-plated layer on the diffusion layer.

6. A process for manufacturing a piston ring comprising:
   forming a nitrided layer by subjecting a surface of a steel body to a nitriding treatment, said steel body having a slidable surface which is to face an inner peripheral surface of a cylinder, a first surface and a second surface both connected to the slidable surface by way of corner portions, wherein the nitriding treatment comprises a first step of high-temperature nitriding and a second step of low-temperature nitriding, wherein an outer surface of the nitrided layer comprises a white layer;
   removing a first portion of the white layer which is formed on the slidable surface to expose a diffusion layer; and
   at least partially removing a second portion of the white layer which is formed on each of the first surface, the second surface and the corner portions such that said second portion has thickness of not more than 5 μm.

7. The process of claim 6, wherein the low-temperature nitriding is carried out at a first temperature within a temperature range of 500° C.±5° C. to 550° C.±5° C., the high-temperature nitriding is carried out at a second temperature within a temperature range of 560° C.±5° C. to 600° C.±5° C., and a difference between the first and second temperatures is not less than 1° C.

8. The process of claim 4, wherein the low-temperature nitriding is carried out at a first temperature within a temperature range of 500° C.±5° C. to 550° C.±5° C., the high-temperature nitriding is carried out at a second temperature within a temperature range of 560° C.±5°

C. to 600° C. ±5° C., and a difference between the first and second temperatures is not less than 1° C.

9. The process of claim 5, wherein the low-temperature nitriding is carried out at a first temperature within a temperature range of 500° C.±5° C. to 550° C.±5° C., the high-temperature nitriding is carried out at a second temperature within a temperature range of 560° C.±5° C. to 600° C.±5° C., and a difference between the first and second temperatures is not less than 1° C.

* * * * *

UNITED STATES PATENT AND TRADEMARK OFFICE
CERTIFICATE OF CORRECTION

PATENT NO. : 5,292,381

DATED : March 8, 1994

INVENTOR(S) : Tsuchiya et al

It is certified that error appears in the above-identified patent and that said Letters Patent is hereby corrected as shown below:

On the title page, Item [30], insert the second Foreign Priority document after that which is already listed on the patent as follows:

—June 25,1992 [JP].........................................4-167700—

Signed and Sealed this

Twenty-first Day of June, 1994

Attest:

BRUCE LEHMAN

Attesting Officer   Commissioner of Patents and Trademarks